United States Patent Office 3,513,161
Patented May 19, 1970

3,513,161
CYANO-STEROIDS
Alberto Consonni, Via Brunelleschi n. 2, and Roberto Sciaky, Via Fiamma n. 13, both of Milan, Italy
No Drawing. Filed Feb. 2, 1968, Ser. No. 702,515
Claims priority, application Italy, Feb. 7, 1967, 12,332A/67
Int. Cl. C07c *173/00, 169/34*
U.S. Cl. 260—239.55                                4 Claims

ABSTRACT OF THE DISCLOSURE

Disclosed are compounds of the formula:

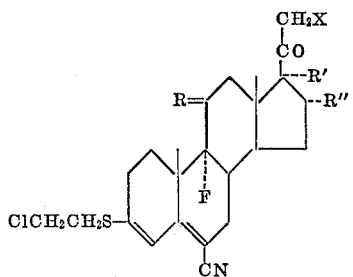

wherein:
  R is selected from the group consisting of $\alpha H(\beta OH)$ and O;
  R' is $\alpha OH$;
  R" is selected from the group consisting of H, $\alpha OH$ and $\alpha CH_3$;
  R' and R" may form together the group

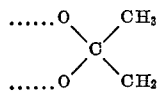

X is selected from the group consisting of H and OY, where
  Y is a radical of a mono- or dicarboxylic organic acid having from 1 to 9 carbon atoms.
These compounds have anti-inflammatory activity. Also disclosed is the preparation of these compounds.

Our invention relates to a new class of cyano-steroids useful in therapy and to the preparation thereof. More particularly, our invention relates to new compounds with the following structural formula:

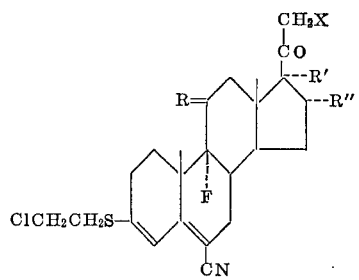

wherein
  R is selected from the group consisting of $\alpha H(\beta OH)$ and O;
  R' is $\alpha OH$;
  R" is selected from the group consisting of H, $\alpha OH$ and $\alpha CH_3$;
  R' and R" may form together the group

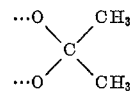

X is selected from the group consisting of H and OY, where
  Y is a radical of a mono- or dicarboxylic organic acid having from 1 to 9 carbon atoms,
and the process for the preparation thereof.

The compounds of the present invention show a good anti-inflammatory activity by topic route.

The new compounds of our invention may be prepared from the corresponding 3-(2'-chloroethylthio)-6-formyl-3,5-pregnadienes (I) which are reacted with hydroxylamine, then acetylated, then deacetylated by heating to obtain the desired end products. The process of the invention may be represented by the following scheme:

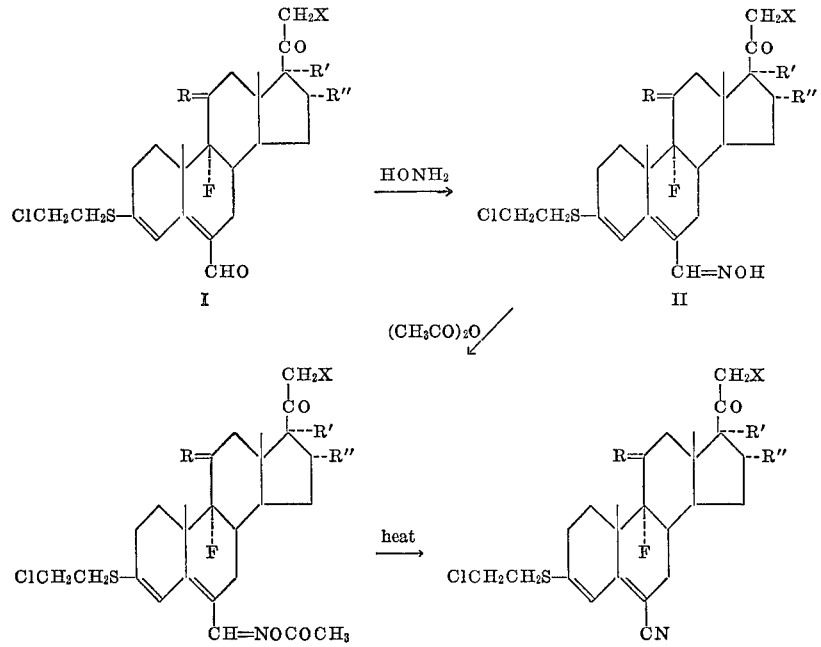

In greater detail, the products of the invention may be prepared from the corresponding 3-(2'chloroethylthio)-6-formyl-3,5-pregnadienes (I) described in the United States patent application 693,096, filed Dec. 27, 1969, of A. Consonni et al. and based upon Italian patent application No. 31646A/66, in a suitable organic solvent, such as an aliphatic alcohol, and reacted with hydroxylamine as the hydrochloride in the presence of a base, such as sodium or potassium acetate. The reaction is carried out at room temperature over a period of from 10 to 80 hours or in the warm for a period of from 1 to 4 hours. The corresponding 3 - (2' - chloroethylthio) - 6 - formyloxime-3,5-pregnadiene (II), thus obtained, is separated by extraction and treated with acetic anhydride in the presence of a base, such as pyridine or triethylamine. The acetylation reaction is carried out preferably at room temperature over a period of from 4 to 40 hours. The resulting 3-(2'-chloroethylthio) - 6 - acetylformyloxime-3,5-pregnadiene (III) is separated by extraction with suitable solvents and then submitted to heating under vacuum at a temperature of from 100°–170° C. for a period of from 30 minutes to 3 hours. The 3-(2'-chloroethylthio)-6-cyano-3,5-pregnadiene, thus obtained, is separated by known extraction techniques and purified by recrystallization from suitable solvents or by chromatography over adsorbent substances and followed by elution with a solvent.

Alternatively the 3 - (2'-chloroethylthio)-6-cyano-3,5-pregnadienes of the invention may be prepared by a process analogous to that above described. The starting products, the corresponding 3-(2'-chloroethylthio) - 6-formyl-3,5-pregnadienes, are condensed with O,N-bis-(trifluoroacetyl)-hydroxylamine, in an organic solvent, such as benzene or toluene, in the presence of a tertiary amine, such as pyridine or triethylamine. The reaction is carried out in the warm, preferably at the boiling temperature of the solvent used, over a period of from 10 to 30 hours. The reaction may also be carried out at room temperature, but the reaction time, in this case, is longer. The end product 3 - (2'-chloroethylthio)-6-cyano-3,5-pregnadiene, thus obtained, is then separated according to the known techniques.

Typical products prepared according to the process of the invention are:

3-(2'-chloroethylthio)-6-cyano-9α-fluoro-3,5-pregnadiene-11β,17α,21-triol-20-one-21-acetate;

3-(2'-chloroethylthio)-6-cyano-9α-fluoro-3,5-pregnadiene-17α,21-diol-11,20-dione-21-acetate;

3-(2'-chloroethylthio)-6-cyano-9α-fluoro-3,5-pregnadiene-11β,16α,17α,21-tetrol-20-one-16,17-acetonide-21-acetate, and 3-(2'-chloroethylthio)-6-cyano-9α-fluoro-16α-methyl-3,5-pregnadiene-11β,17α,21-triol-20-one-21-acetate.

Other typical products of the invention are 21-acyl derivatives, wherein the acyl is the radical of a mono- or dicarboxylic organic acid having from 1 to 9 carbon atoms in the molecule; particularly 21-propionate, 21-butyrate, 21-valerate, 21-hexanoate, 21-caproate, 21-octanoate, 21-hemisuccinate, 21-cyclopentylpropionate.

The products of the present invention have a good anti-inflammatory activity. In particular, they show a dissociation between local and systemic anti-inflammatory activity without the undesired side effects which normally appear with products administered by systemic route. The anti-inflammatory activity of the products of the invention has been determined according to the method described by Robert A. et al., (Acta Endocrinol. 25, 1957, p. 105–112) on groups of albino rats of 8–10 animals per group.

Administration had been effected by:
(1) local route (Selye pouch), only once;
(2) local route daily; and
(3) oral route daily.

In the following table are the values of the effective dose $ED_{50}$, that is the dose, expressed in μg., which inhibits 50% of the inflammatory exudate in comparison to the untreated controls. Values of dexamethasone are also included for comparison.

TABLE

| Compound | $ED_{50}$ | | |
|---|---|---|---|
| | Once local route, μg. | Daily local route, μg./day | Daily oral route, μg./day |
| Dexamethasone | 184 | 0.56 | 4.24 |
| 3-(2'-chloroethylthio)-6-cyano-9α-fluoro-3,5-pregnadiene-11β,17α,21-triol-20-one-21-acetate | 120 | 1.2 | >300 |
| 3-(2'-chloroethylthio)-6-cyano-9α-fluoro-3,5-pregnadiene-11β,16α,17α,21-tetrol-20-one-16,17-acetonide-21-acetate | 42 | 0.46 | >300 |

The clinical indications are preferably: skin diseases, eczema, psoriasis, urticaria, allergic syndromes, rheumatic arthritis, uratic arthritis, nephrosic syndromes, conjunctivitis, ophthalmia, synovitis and shock states. The compounds of the present invention are preferably administered by local or topical route. Therapeutic compositions comprise one or more of the compounds of the present invention with a certain quantity of pharmaceutically liquid or solid vehicle. The compositions may be prepared as tablets, powders, ointments, solutions or emulsions or others commonly employed for this purpose. Excipients may be employed among which the most suitable are starch, lactose, talc, magnesium stearate and their analogues.

The following examples serve to illustrate the invention without limiting it.

EXAMPLE 1

3-(2'-chloroethylthio)-6-cyano-9α-fluoro-3,5-pregnadiene-11β,17α,21-triol-20-one-21-acetate 100 mg. of hydroxylamine hydrochloride and 130 mg. of potassium acetate were added to 700 mg. of 3-(2'-chloroethylthio)-6-formyl-9α-fluoro - 3,5 - pregnadiene-11β,17α,21-triol-20-one-21-acetate suspended in 30 cc. of absolute ethyl alcohol. The mixture was stirred for two hours and then kept at room temperature for 60 hours. The solution was concentrated, diluted with water and the steroid extracted with ethyl acetate. The extracts were washed with water, dried over anhydrous sodium sulphate and evaporated to dryness. The residue consisting of crude 3-(2'-chloroethylthio)-6-formyloxime-9α-fluoro-3,5-pregnadiene-11β,17α,21-trnol-20-one-21 - acetate was dissolved in 5 cc. of pyridine and treated with 1 cc. of acetic anhydride at room temperature overnight. The solution was diluted with water and the steroid extracted with ethyl acetate. The extracts were washed with water, dried over anhydrous sodium sulphate and evaporated to dryness. The residue, which absorbs at U.V. at 250 and 330 mμ and consists of the corresponding 6-acetylformyloxime, was warmed, under vacuum (1–2 mm. Hg), to 120° C. for 60 minutes. A crude product dissolved in ethylacetate and chloroform (1:1) was obtained. The solution was passed over a column of Florisil eluting with acetate of ethyl-chloroform (1:1); the eluate was evaporated to dryness and the residue, crystallized from acetone/petroleum ether, yielded 200 mg. of 3-(2'-chloroethylthio)-6-cyano-9α-fluoro-3,5-pregnadiene - 11β,17α,21-triol-20-one-21-acetate, melting at 206–209° C.; $\lambda_{max}$. 307 mμ; ε=21,000; $[\alpha]_D$=0° (c.=1% in chloroform).

EXAMPLE 2

3-(2'-chloroethylthio)-6-cyano-9α-fluoro-3,5-pregnadiene-11β,16α,17α,21-tetrol-20-one-16,17-acetonide-21-acetate 180 mg. of hydroxylamine hydrochloride and 240 mg. of potassium acetate were added to a solution of 1.3 g. of 3-(2'-chloroethylthio) - 6 - formyl-9α-fluoro-3,5-pregnadiene-11β,16α,17α,21-tetrol-20-one - 16,17 - acetonide-21-acetate. The reaction mixture was kept at room temperature for 20 hours, concentrated to a small volume under vacuum, diluted with water, and the steroid was extracted with ethyl acetate. The combined extracts, washed with water, dried over anhydrous sodium sulphate and evaporated to dryness, yielded pure 3-(2'-chloroethylthio)-6-formyloxime-9α-fluoro-3,5-pregnadiene - 11β,16α,17α,21-tetrol-20-one-16,17-acetonide-21 - acetate. This product was dissolved in 7 cc. of anhydrous pyridine and treated with 1.5 cc. of acetic anhydride at room temperature for 5 hours. Upon dilution with water, the steriod precipitated was extracted with ethyl acetate. The extracts, washed with water, dried over anhydrous sodium sulphate and evaporated to dryness, yielded 1.35 g. of crude 6-acetyl-formyloxime. This was warmed up to 120° C. under vacuum (1–2 mm. Hg) for 60 minutes. The residue was then dissolved in benzene and chromatographed over 30 g. of Florisil. From the fractions eluted with benzene and ether in the ratio 95:5 a crude product was obtained. This, when crystallized from ether/petroleum ether/acetone, yielded 430 mg. of 3-(2'-chloroethylthio)-6-cyano-9α-fluoro-3,5-pregnadiene-11β,16α,17α,21 - tetrol-20-one-16,17-acetonide-21 - acetate, melting at 221–223° C.;

$\lambda_{max.}^{EtOH}$ 307 mμ

ε=23,800; [α]$_D$=+5° (c.=1% in chloroform).

EXAMPLE 3

3-(2'-chloroethylthio)-6-cyano-9α-fluoro-3,5-pregnadiene-11β,16α,17α,21-tetrol-20-one-16,17-acetonide-21-acetate 1 g. of 3-(2'-chloroethylthio)-6-formyl-9α-fluoro-3,5-pregnadiene - 11β,16α,17α,21-tetrol-20-one-21-acetate-16,17-acetonide-21-acetate was refluxed for 1 hour with 20 cc. of anhydrous benzene, 0.5 cc. of pyridine and 0.800 g. of O,N - bis - (trifluoroacetyl)-hydroxylamine. The solution was cooled. The mixture was poured into a separatory funnel and diluted with benzene. The mixture was then washed with water, the aqueous phase was removed, the solution dried over anhydrous sodium sulphate and the solvent was distilled off under vacuum. A residue of 1 g. remained which was chromatographed over 25 g. of Florisil (Registered Trademark). From the fractions eluted with benzene/ethyl ether (3:1), a product melting at 221–223° C. crystallized.

We claim:
1. A process for preparing steroids having the formula:

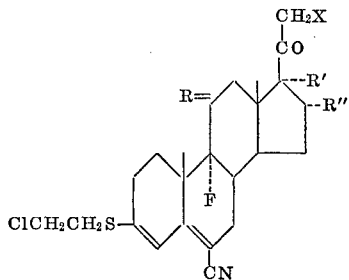

wherein
R is selected from the group consisting of αH(βOH) and O;
R' is αOH;
R" is selected from the group consisting of H, αOH and αCH$_3$;

R' and R" may form together the group

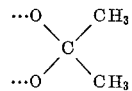

X is selected from the group consisting of H and OY, where
Y is a radical of a mono- or dicarboxylic organic acid having from 1 to 9 carbon atoms, which comprises reacting the corresponding 3-(2'-chloroethylthio)-6-formyl-3,5-pregnadiene in an organic solvent with hydroxylamine hydrochloride in the presence of a base, separating the resulting 3 - (2'-chloroethylthio)-6-formyloxime-3,5-pregnadiene which is then reacted with acetic anhydride in the presence of a base to yield the 3 - (2' - chloroethylthio) - 6 - acetylformyloxime - 3,5-pregnadiene, separating the 3 - (2' - chloroethylthio) - 6-acetylformyloxime-3,5-pregnadiene and heating the same under vacuum from 100° to 170° C. for from 30 minutes to 3 hours to yield the 3-(2'-chloroethylthio)-6-cyano-3,5-pregnadiene and isolating the same.

2. A compound having the formula:

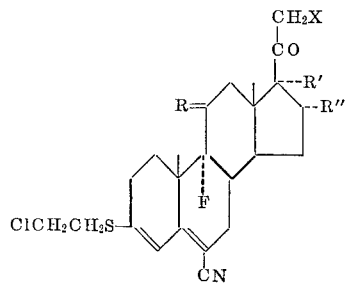

wherein
R is selected from the group consisting of αH(βOH) and O;
R' is αOH;
R" is selected from the group consisting of H, αOH and αCH$_3$;
R' and R" may form together the group

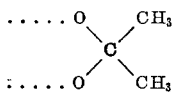

X is selected from the group consisting of H and OY, where
Y is a radical of a mono- or dicarboxylic organic acid having from 1 to 9 carbon atoms.

3. The compound of claim 2, which is 3-(2'-chloroethylthio) - 6 - cyano-9α-fluoro-3,5-pregnadiene-11β,17α,21-triol-20-one-21-acetate.

4. The compound of claim 2, which is 3-(2'-chloroethylthio) - 6 - cyano-9α-fluoro-3,5-pregnadiene-11β,16α,17α,21-tetrol-20-one-16,17-acetonide-21-acetate.

No references cited.

HENRY A. FRENCH, Primary Examiner

U.S. Cl. X.R.
260—397.45, 999